E. G. GORY.

Improvement in Casters.

No. 127,862.  Patented June 11, 1872.

Attest
Henry Millward
Wm. R. McComas

Inventor
Emanuel G. Gory
By F. Millward
Attorney 127,862

UNITED STATES PATENT OFFICE.

EMANUEL G. GORY, OF CINCINNATI, OHIO.

IMPROVEMENT IN CASTERS.

Specification forming part of Letters Patent No. 127,862, dated June 11, 1872.

I, EMANUEL G. GORY, of Cincinnati, Hamilton county, State of Ohio, have invented a certain new and useful Improvement in Casters, of which the following is a specification:

Nature and Objects of Invention.

This invention relates to that class of furniture-casters in which the journals of the roller being cast or otherwise permanently secured thereto, have their bearings in pockets or cavities cast in the arms of the frame, from which, when once inserted, they cannot be withdrawn except by skillful manipulation.

My improvement is intended to do away with the use of a core for forming the bearings in casting the frame; and to this end it consists in the use of a rimmed roller, the journals of which rotate in open semicircular notches in the lower edges of the arms of the frame, in combination with inwardly-projecting spurs on the outer ends of the arms of the frame, which spurs, after the parts have been properly connected together, embrace the web of the roller between the journals and its rim, and serve to prevent the accidental disengagement of the journals from their bearings.

Description of the Accompanying Drawing.

Figure 1:
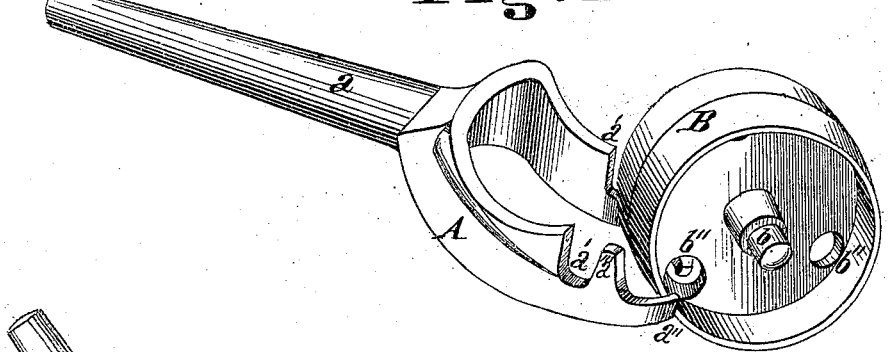
Figure 2:
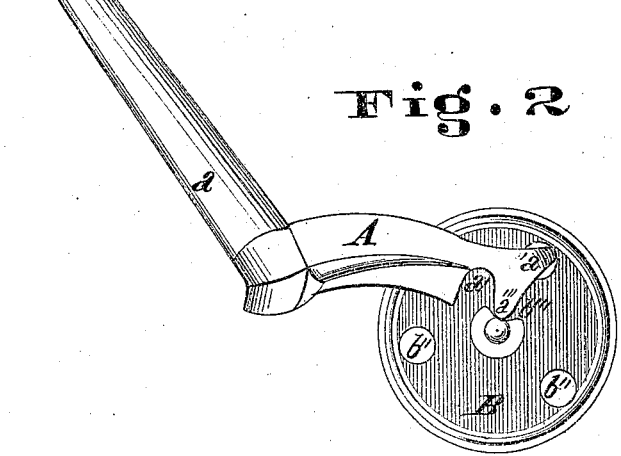
Figure 3:
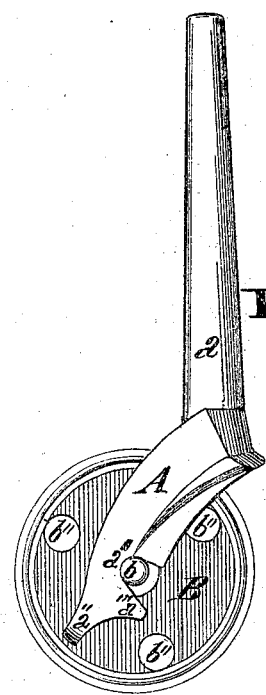
Figure 4:
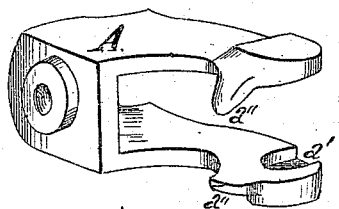

Figure 1 is a perspective view of the wheel and frame detached from each other. Fig. 2 is a plane elevation of the wheel and frame, showing the wheel in the act of being placed in the bearings. Fig. 3 is a view of the caster complete with the wheel in place. Fig. 4 is a perspective view of a modification in the form of the frame.

General Description.

A is the frame, which may be either formed with a shank, $a$, for connection with a socket, or be shaped as in Fig. 4 to form the lower part of a "plate caster." It is formed with side openings $a'$, the bottoms of which serve as bearings for the axle of the wheel. The wheel B is formed in one piece with axles $b$ to fit the openings $a'$ at the bottom.

In order to prevent the accidental displacement of the wheel while the caster is in use, the frame A is constructed with protruding points $a''$, which are so close together at their extremities as to leave a space between less than the width of the face of the wheel. Holes $b''$ are cast in the central web of the wheel, through which the points may be inserted in order to permit the parts (wheel and frame) to go together, and a recess, $b'''$, is formed in the hub of the wheel to allow the projection $a'''$ to pass.

When the parts are together it is impossible to displace them in use, it being necessary to pursue a defined course (in order to effect a separation) which can never occur in use.

For some modifications of this caster the holes $b''$ are unnecessary, and the recess $b'''$ may be omitted, it being, in these modifications, (such as porcelain-wheel casters,) simply necessary to have a rim on the wheel and the projecting points on the frame.

In this class of casters the inwardly-projecting spurs are "sprung" over the rim of the roller, the arms of the frame being sufficiently elastic to permit of this.

With the improved caster it will be seen that drilling either in the frame or wheel is dispensed with, and the necessity of a separate axle is avoided.

Claim.

The rimmed roller B, having fixed journals $b$, in combination with the inwardly-projecting spurs $a''$ and open bearings $a'$ of the frame A, substantially as and for the purpose specified.

In testimony of which invention I hereunto set my hand.

EMANUEL G. GORY.

Witnesses:
J. L. WARTMANN,
E. F. LAYMAN.